(No Model.)
F. W. MALLETT.
STEAM FEED PIPE FOR PLATEN LUMBER DRIERS.
No. 578,110. Patented Mar. 2, 1897.
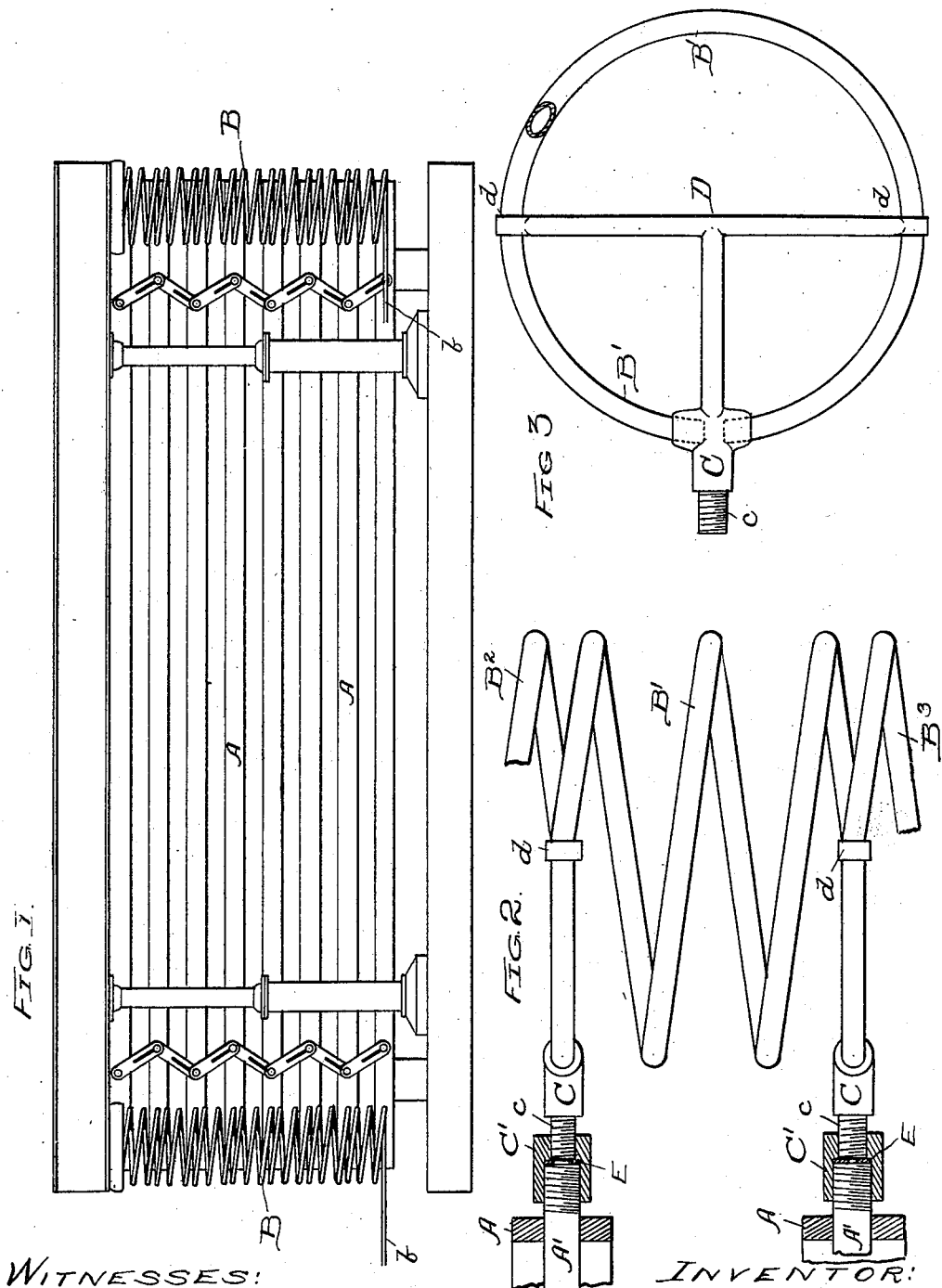
WITNESSES:
INVENTOR:
FRANCIS W. MALLETT
BY Munday, Evarts & Adcock,
HIS ATTORNEYS.

UNITED STATES PATENT OFFICE.

FRANCIS W. MALLETT, OF NEW YORK, N. Y., ASSIGNOR TO GEORGE B. HOWARD, OF SAME PLACE, AND AARON S. NICHOLS, OF CHICAGO, ILLINOIS.

STEAM FEED-PIPE FOR PLATEN LUMBER-DRIERS.

SPECIFICATION forming part of Letters Patent No. 578,110, dated March 2, 1897.

Application filed March 9, 1896. Serial No. 582,339. (No model.)

*To all whom it may concern:*

Be it known that I, FRANCIS W. MALLETT, a citizen of the United States, residing in New York, in the county of New York and State of New York, have invented a new and useful Improvement in Steam Feed-Pipes for Platen Lumber-Driers, of which the following is a specification.

In that class of lumber-driers shown in the patent to A. S. Nichols, No. 390,697, dated October 9, 1888, and consisting of a series of individually-heated platens adapted to be opened and closed, it has been customary to connect the steam-supply with the coiled pipes in the platens by means of pipes having two or more flexible or movable joints, in order to accommodate the movements of the platens without rupture of the pipes. These joints must be made of brass, and the horizontal portions of the connecting-pipes require considerable length, so that large quantities of pipe are needed. This construction is not only expensive, but difficult to keep in order, and my object in the present invention has been to provide a substitute for the jointed feed-pipes heretofore used, in which substitute I may dispense with all movable or flexible joints and avoid the leakage of steam incident thereto as well as the labor required in keeping them in repair; and the substitute which I have devised consists of a flexible coiled feed-pipe connected to the source of steam-supply at one end and coupled at intervals along its length to the several platens. This coiled pipe is arranged vertically in close proximity to the platens, so that the couplings connecting it to the platens may be short and severe strains upon the couplings in transmitting the movement of the platens to the coils of the pipe be avoided. The coils of the pipe open or expand when the platens open, and they close together or compress when the platens close. The pipe opens or shuts and compresses very much as a coiled spring would if power were applied to it in the same manner. I prefer, instead of making the flexible feed-pipe of one continuous length of tubing and cutting openings in it at the points where the pipe is coupled to the platens, to make it in short pieces or sections, each extending from one platen-coupling to the next coupling in the series, and to utilize the same couplings by which the pipe is connected to the platens as the means of uniting the meeting ends of adjacent pipe-sections. With this feature embodied each pair of adjacent platens are connected by their respective couplings to the opposite ends of the same section of the feed-pipe, and such section consequently is only one of the series of sections affected by the opening and closing of those platens. I also prefer to provide a rigid support or stay for the feed-piping at its junction with the several couplings, such support or stay being adapted to prevent any springing or flexure by that portion of the feed-piping immediately adjacent to the couplings, and thus to obviate any tendency it may have to break at those points or to loosen its attachment to the couplings.

A further feature of the invention is found in the graduating of the steam-passages in the couplings leading to the platens, the passage nearest the steam-supply being smallest, the next in order being somewhat larger, the third still larger, and so on through the series. By this feature I am enabled to equalize the heat throughout the series of platens, and thus heat all the lumber to the same degree. Heretofore there has been difficulty in maintaining all parts of the apparatus at the same temperature, owing to the fact that the platens whose connections are nearest the steam-supply take more than their share of the steam, but my invention corrects this.

All these features of the invention are fully set forth below, and also shown in the accompanying drawings, in which—

Figure 1 is a side elevation of a platen-drier provided with my invention. Fig. 2 is an enlarged detail elevation of a portion of my improved feed-pipe, and Fig. 3 is a horizontal section of said pipe.

In the drawings, A A represent the series of platens, each containing a coil of heating-pipes or a steam chamber or chambers adapted to receive steam, the platens being adapted to open and close in the usual manner. As shown, they are open and ready for the insertion of the lumber to be dried. At the side of the platens or at any point convenient for a rigid connection with them I place my newly-devised flexible coiled steam feed-pipe B. The end, preferably the lower one $b$ of this pipe, is joined to a source of steam-supply. (Not shown.) The pipe is preferably formed or made up of a series of short spirally-coiled pipe-sections $B'$ $B^2$ $B^3$, &c., each extending form one coupling C to the next one. The tubing used in the sections $B'$ $B^2$, &c., is of such diameter and thickness of metal as will permit the pipe when coiled as shown to yield to the movements of the platens, opening or closing with them, according to the direction of the movement. Moreover, the tubing should be of such a character as will endure the amount of flexure required without injury. The sections $B'$ are joined at each end to the couplings C, which are T-shaped, so as to adapt them not only to serve as a means of uniting the ends of the pipe-sections, but also as a means of connecting the pipe to the platens, the stem $c$ of the coupling C being threaded to engage the sleeve or union $C'$, which is threaded on the end of the piping $A'$ of the platen.

In Fig. 2 I have shown a section $B'$ as having three turns or coils between the couplings; but it will be understood that I do not wish to be limited to that number, as obviously a greater or less number can be used; nor do I wish to be limited in my main claims to a spirally-coiled feed-pipe, although that form is to be preferred.

The feed-pipe may be connected to all the platens in the way described or to alternate platens only, an additional feed-pipe B being necessary in the latter case to serve the platens not supplied by the first-mentioned coil, and such an additional one is shown in Fig. 1.

The stay or support for holding the pipe-sections rigid adjacent to the couplings is shown at D. It is preferably attached to or in one piece with the coupling C or otherwise supported from the same platen to which the coupling is joined. It is also preferably made in the form of a T, each of the arms extending to the pipe at either side of the circle and being provided upon their extremities with eyes $d$, in which the pipe may be inserted prior to its being brazed or otherwise secured in the coupling. Where the pipe is made in short sections, as already described, the stay is adapted to support the abutting ends of adjacent pipe-sections, as will be understood from Figs. 2 and 3, and in all cases it confines the flexure to the coiled portions of the feed-pipe lying between the eye of one stay and the nearest eye of the next stay and prevents the flexure being felt at the coupling C. This result necessarily follows, because the stays being themselves rigidly supported hold the short arcs or portions of the pipe lying between the eyes $d$ and the couplings to which the eyes are attached rigid against flexure.

The graduating of the steam-passages leading to the platens may be obtained in any suitable way, but I prefer to insert disks E between the ends of the platen-pipe $A'$ and the end of the coupling-stem $c$, and the central openings in these disks may be graduated to admit only the amount of steam which it is desired should be fed to the platens, respectively.

I claim—

1. The combination with the movable platens of a lumber-drier, of a flexible coiled feed-pipe connected to the platens and adapted to move with them, substantially as specified.

2. The combination with the movable platens of a lumber-drier, of a flexible coiled feed-pipe consisting of short coiled sections and couplings uniting the same, said feed-pipe being connected to the platens and adapted to move with them, substantially as specified.

3. The combination with the movable platens of a lumber-drier, of a flexible coiled feed-pipe consisting of short coiled sections and couplings serving both to unite the adjacent sections together and as a means of joining the platens to the feed-pipe, substantially as specified.

4. The combination with the movable platens of a lumber-drier, of a flexible coiled feed-pipe connected to the platens and adapted to move with them, and stays for preventing flexure in said feed-pipe at the joints, substantially as specified.

5. The combination with the movable platens of a lumber-drier, of a flexible coiled feed-pipe connected to the platens and adapted to move with them, and stays rigid with the platens for holding the pipe against flexure at the joints, substantially as specified.

6. The combination with the movable platens of a lumber-drier, of a flexible coiled feed-pipe coupled to the platens and stays attached to the couplings uniting the feed-pipe to the platens, and serving to hold the feed-pipe rigid at its junction with the couplings, substantially as specified.

7. The combination with the movable platens of a lumber-drier, of a flexible coiled feed-pipe connected to the platens and adapted to move with them, the feed-passages connecting the feed-pipe with the platens being graduated to regulate the amount of steam admitted to the platens, substantially as specified.

FRANCIS W. MALLETT.

Witnesses:
EDWARD DANFORTH,
J. H. WATSON.